United States Patent [19]

Sogabe et al.

[11] Patent Number: 5,189,491
[45] Date of Patent: Feb. 23, 1993

[54] METHOD OF MEASURING TRACK DISPLACEMENT ON A MAGNETIC TAPE

[75] Inventors: Yasushi Sogabe, Osaka; Kenji Matsuura; Shigeki Murata, both of Nara, all of Japan

[73] Assignee: Matsushita Electric Industrial Co., Ltd., Osaka, Japan

[21] Appl. No.: 712,040

[22] Filed: Jun. 7, 1991

[30] Foreign Application Priority Data

Jun. 11, 1990 [JP] Japan .................. 2-151941

[51] Int. Cl.$^5$ ............... G01B 11/14; G01N 27/84
[52] U.S. Cl. .................. 356/372; 356/373; 356/375; 324/214; 324/216
[58] Field of Search ............ 356/372, 373, 36, 38; 324/200, 207.11, 207.24, 207.25, 210, 214, 215, 216, 170, 172; 382/8, 22; 358/328, 330, 340, 334

[56] References Cited

U.S. PATENT DOCUMENTS 2,530,564 11/1950 Blanky ........................ 324/214
3,825,821 7/1974 Förster ........................ 324/216
3,988,530 10/1976 Ikegami et al. ............... 356/430

FOREIGN PATENT DOCUMENTS 61-18804 5/1986 Japan .

OTHER PUBLICATIONS

"Interchangeability of Recorded Magnetic Video Tapes for Video Tape Recorders" Standards of Electronic Industries Association of Japan, Magnetic Tape Format, Sep. 1969, Prepared By VTR Technical Commitee, pp. 12, 18.

*Primary Examiner*—Richard A. Rosenberger
*Assistant Examiner*—Hoa Q. Pham
*Attorney, Agent, or Firm*—Wenderoth, Lind & Ponack

[57] ABSTRACT

A method and an apparatus for obtaining a displacement condition of a track in a longitudinal direction thereof on a magnetic tape on which a periodic signal is recorded by detecting a signal position from image information obtained by imaging said track while moving the magnetic tape and/or the image device in the longitudinal direction of the track.

3 Claims, 6 Drawing Sheets

METHOD OF MEASURING TRACK DISPLACEMENT ON A MAGNETIC TAPE

BACKGROUND OF THE INVENTION

1. Field of the Invention

The present invention relates to a method and apparatus for measuring a displacement in a longitudinal direction of a track recorded on a magnetic tape.

2. Description of the Prior Art

In recording a video signal on a magnetic tape, normally a video image of 1 field constituted by a plurality of scanning lines is recorded as a single track. Accordingly, signals of the plurality of scanning lines are recorded in a longitudinal direction of the track, and horizontal scanning signals are recorded at constant intervals at the boundaries thereof. However, when the signal recording interval in the longitudinal direction of a track fluctuates according to the variations of the magnetic tape running speed and the like, collapse may occur in the recorded interval of the horizontal scanning signal. When the horizontal scanning signals are recorded at varying intervals, distortion occurs on the video image. This is a condition called jitter. Thus, fluctuation of the recording position of the signal in the longitudinal direction of a track is a significant matter which causes a deterioration of the video image.

Conventionally, evaluation of jitter has been performed by reading out the horizontal scanning signal recorded on the magnetic tape or a signal for measurement of time fluctuations recorded on the magnetic tape by a rotating head and measuring the fluctuation of said signals (e.g., Japanese Patent Publication No. 61-18804/1986).

However, according to the conventional method as described above, there has been a problem that, as the jitter is detected under the condition where the factor based on the inequality of intervals of the horizontal scanning signals recorded on the magnetic tape and the factor attributed to the structural system of the recording apparatus including the rotating head are mixed, such a state becomes an obstacle to the case of clarifying the cause for the jitter based on the individual factors.

SUMMARY OF THE INVENTION

An object of the present invention is to provide a method and apparatus for measuring a displacement of a track in a longitudinal direction thereof on a magnetic tape.

In order to attain the above object, the present invention comprises an imaging step for picking up by an image device a track of a magnetic tape on which a periodically changing signal is recorded, a moving step for moving the magnetic tape and/or the image device in a longitudinal direction of the track, and a detection step for detecting a displacement of the track in the longitudinal direction of the track by detecting a position of the signal from image information obtained by the image device.

By the abovementioned construction, it becomes possible to measure the displacement of the signal recording position in the longitudinal direction of the track recorded on a magnetic tape. Accordingly, by using this signal recording position information, the resulting jitter generated by the recording position of the signal recorded on the magnetic tape can be clarified. Further, it becomes an effective means for analyzing the factors for reducing jitter.

DESCRIPTION OF THE PREFERRED EMBODIMENT

A method of measuring a track displacement on a magnetic tape in accordance with an embodiment of the present invention is explained with reference to the drawings.

Figure 1:
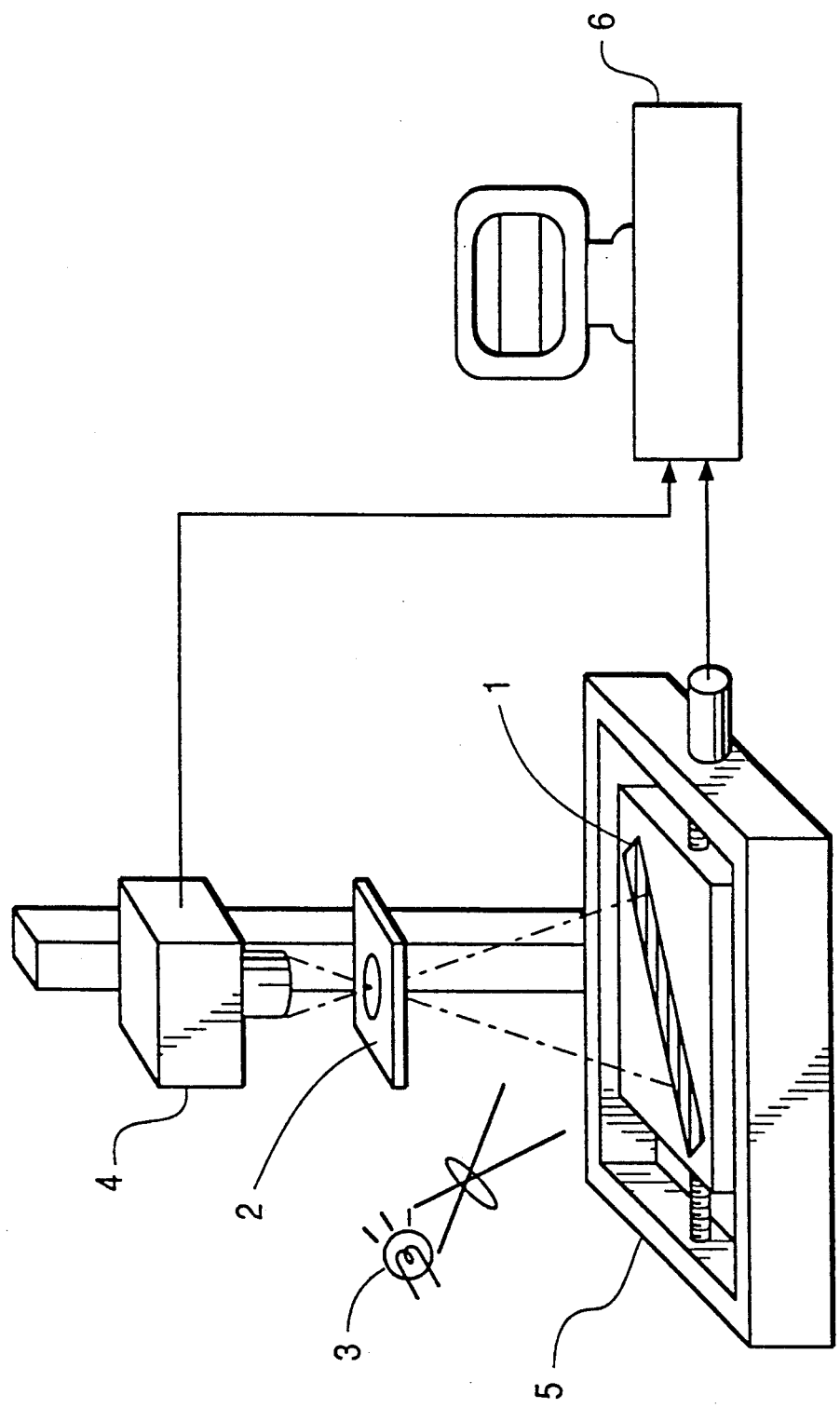
FIG. 1 is a view showing a magnetic recording signal measuring apparatus in accordance with an embodiment of the present invention.
Figure 2:
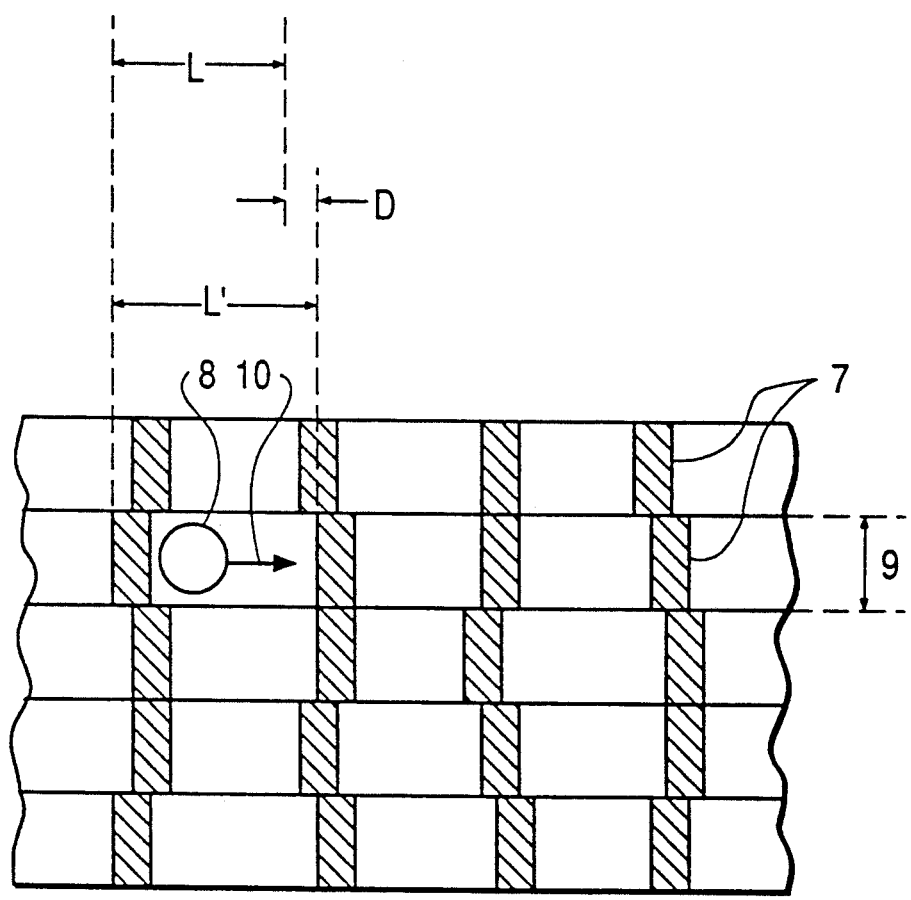
FIG. 2 is a diagram showing the condition of the developed track of the same.

FIG. 1 is a view showing a magnetic recording signal measuring apparatus in accordance with an embodiment of the present invention. A magnetic tape 1 which is cut into a specified length is developed by the adhesion of a magnetic powder obtained by coating the tape with a magnetic liquid, e.g. a colloidal liquid of magnetite powder. The magnetic powder adheres to the magnetic tape 1 according to the condition of magnetization recorded thereon. Accordingly, when light is cast from a specified direction using a light 3, the reflected light corresponding to the magnetization condition of the tape is observed. FIG. 2 illustrates a part of the visualized magnetic tape. In FIG. 2, the recorded signal contains only the horizontal scanning signal as a signal having a fixed interval of recording time. The signal has been recorded with a magnetic head in which the relative speed between the magnetic head and the magnetic tape has been held constant. Further, no azimuth angle is provided. Accordingly, when light is cast from one direction, only the region 7 in which the horizontal scanning signal is recorded is observed to have a high luminance, and the remaining region in which the reflected light is scattered is observed to have a low luminance.

The light source 3, optical system 2 and photoelectric conversion device 4 in FIG. 1 are arranged with position adjustments so as to permit observation of the magnetic tape as in FIG. 2. Further, the positions are adjusted so that a local region 8 is focused on the photoelectric conversion device 4. The region 8 is set so as not to extend over the track width 9. As the photoelectric conversion device 4 has a function to convert the light amount of the incident reflected light into a current, the current value t be outputted varies according to the brightness of the image forming regions 8.

Figure 3:
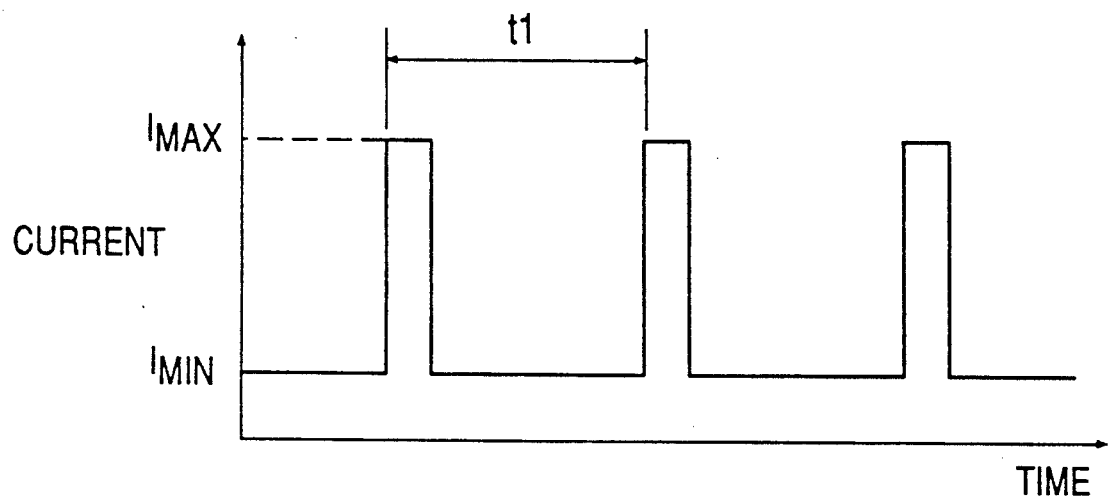
FIG. 3 is a diagram of the current waveform outputted from the photoelectric conversion device used in carrying out measurements.

Hereinafter, measuring procedures are described. When the region 8 forming an image on the photoelectric conversion device 4 is moved in the direction of arrow 10 in FIG. 2 (that is, the longitudinal direction of the track) by moving the movable table 5 in FIG. 1 at a constant speed, the region of high luminance and the region of low luminance are alternately image-formed on the photoelectric conversion device 4, so that the waveform of the output current from the conversion device 4 becomes a pulse wave as shown in FIG. 3. When the region 8 is in each of the regions in which the horizontal scanning signal is recorded, the current value becomes a high level Imax, and in the other regions the current value become a low level Imin. These current values are inputted to an analysis device 6.

The processing with the analysis device is as described below. Assume that the horizontal scanning signal has been recorded at time intervals of T[sec] and assume that the relative speed V[mm/sec] between the magnetic tape 1 and the magnetic head (not illustrated) is kept constant. These conditions have been recorded in advance in the analysis device 6. Further, assuming the moving speed of the movable table 5 to be V' [mm/sec] and the time interval of the current pulse wave to be $t_1$, a distance L on the magnetic tape between two adjacent horizontal scanning signal recorded positions should ideally be.

$$L = T \times V \quad (1)$$

However, a distance L' on the magnetic tape between two adjacent actual horizontal scanning signal recorded positions becomes:

$$L' = t_1 \times V' \quad (2)$$

Accordingly, a displacement amount D of the signal recorded position can be obtained by:

$$D = L' - L \quad (3)$$

Figure 5:
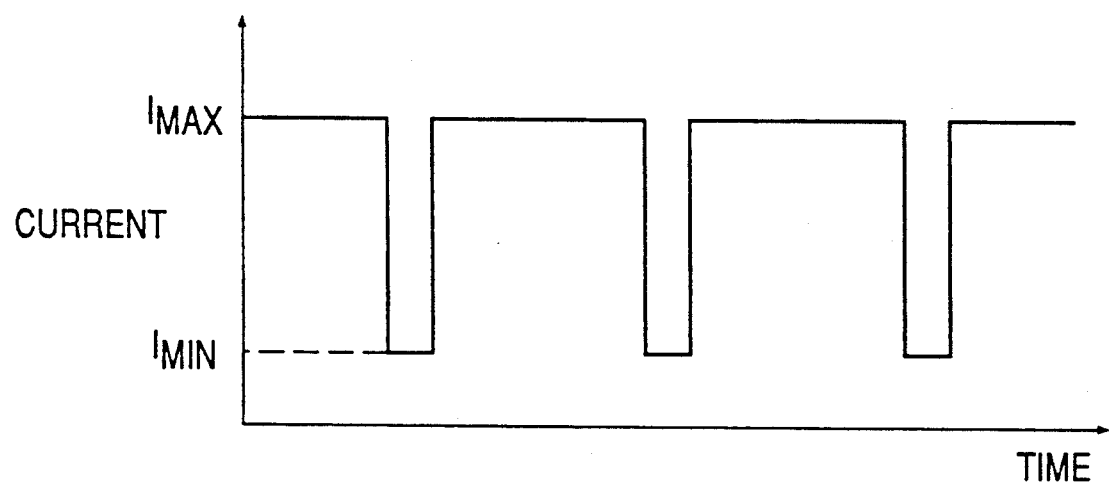
FIG. 5 is a diagram of the current waveform outputted from the photoelectric conversion device when the signal in the condition of FIG. 4 is measured.
Figure 4:
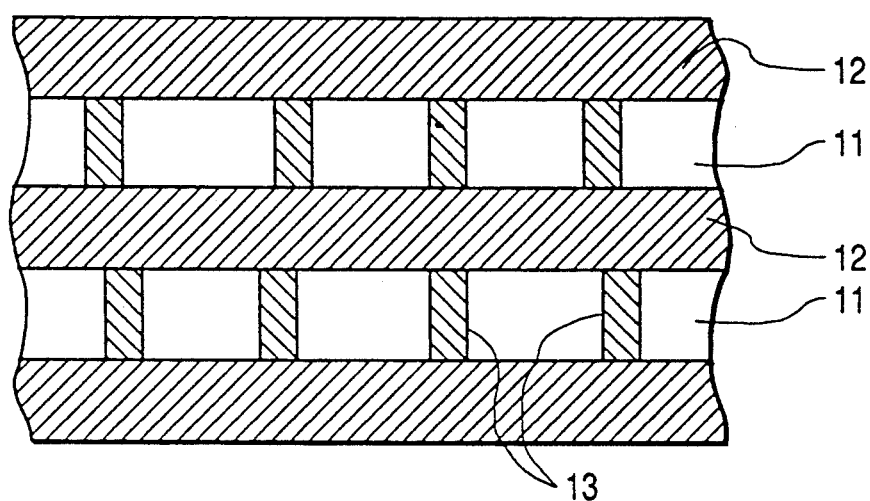
FIG. 4 is a diagram showing the condition of the track when a video signal is recorded.

In this embodiment, there is shown an example of recording only the horizontal scanning signal having a constant recording time interval as a recording signal. However, a video signal may be recorded. In this case, the signal to be recorded on a magnetic tape 1 is recorded such that the signals on every other track have the same azimuth angle and the signals on adjacent tracks have different azimuth angles from each other in order to reduce crosstalk from the adjacent track signals. Accordingly, the developed tracks alternately show the different directions of adhesion of the magnetic powder. When the magnetic tape is illuminated from a specified direction, only the reflected light from the track of one of the different azimuth angles is observed, so that the whole magnetic tape 1 is observed as bright and dark lattice pattern. The area 11 is a bright part, and the area 12 is a dark part. Further, the bright part is observed with a varying luminance according to the frequency of the recorded signal. Here, the horizontal scanning signal recorded region 13 is detected at a lower luminance than the video signal recorded region because its frequency is lower than that of the video signal. Here, when the structural elements in FIG. 1 are arranged so that the photoelectric conversion element 4 detects a local region in the bright part 11 and the movable table is moved in the track longitudinal direction as noted above, the current outputted from the photoelectric conversion device 4 has a waveform as shown in FIG. 5. When the photoelectric conversion device 4 forms an image on the position of the horizontal scanning signal recorded region 13, the output current becomes a low level Imin and in the video signal recorded region becomes a high level Imax. Accordingly, in this case also, as it is possible to detect the position of the horizontal scanning signal in the same way as described before, similar effect can be obtained.

Figure 6A:
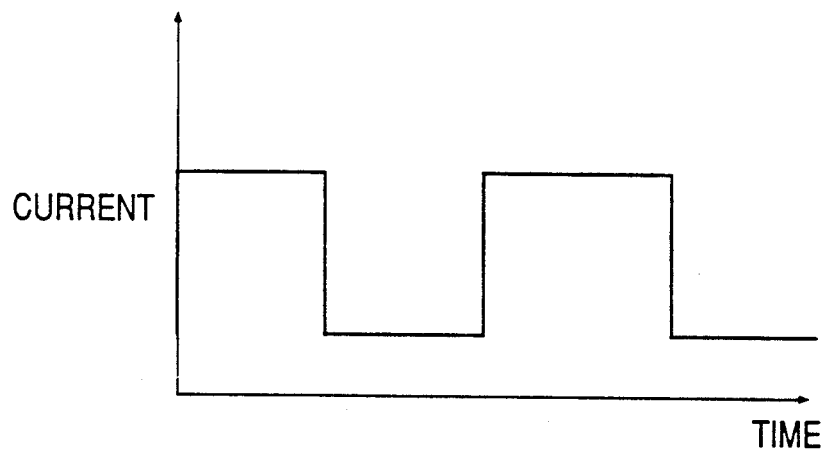
FIGS. 6(a), (b) and (c) are examples of current waveforms outputted from the photoelectric conversion device.
Figure 6B:
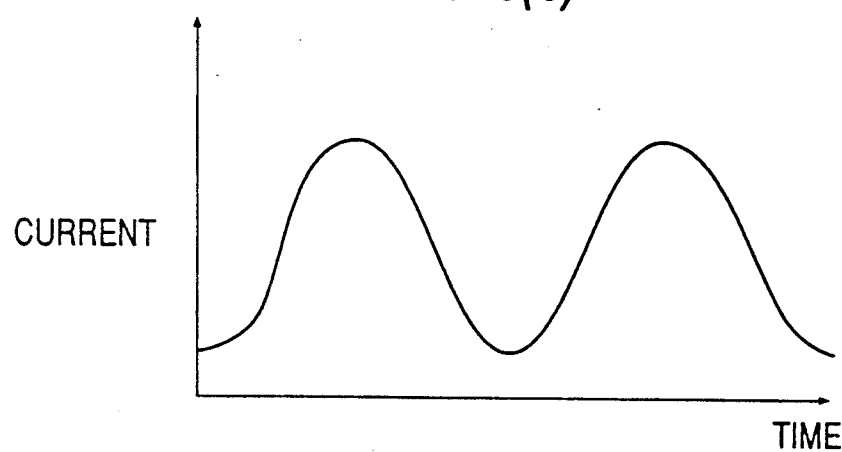
Figure 6C:
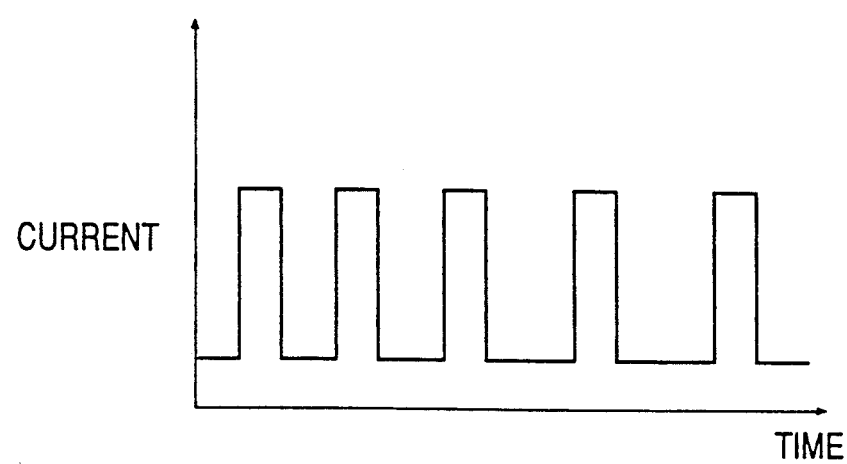

Further, the signal to be recorded may not be a horizontal scanning signal but may be a signal having a periodically varying frequency. For example, when the current waveform outputted from the photoelectric conversion device is a rectangular pulse waveform of approximately 1:1 duty ratio as shown in FIG. 6(a), the signal can be detected with good precision, but in the case of the gradually level changing waveform as shown in FIG. 6(b), the precision is lowered because it is difficult to detect the characteristic part (high level part) of the signal. Further, when the current is a pulse waveform signal in which the characteristic part of the signal does not occur at constant intervals as shown in FIG. 6(c), a similar advantageous effect can be obtained if the recording time interval is known.

Figure 7:
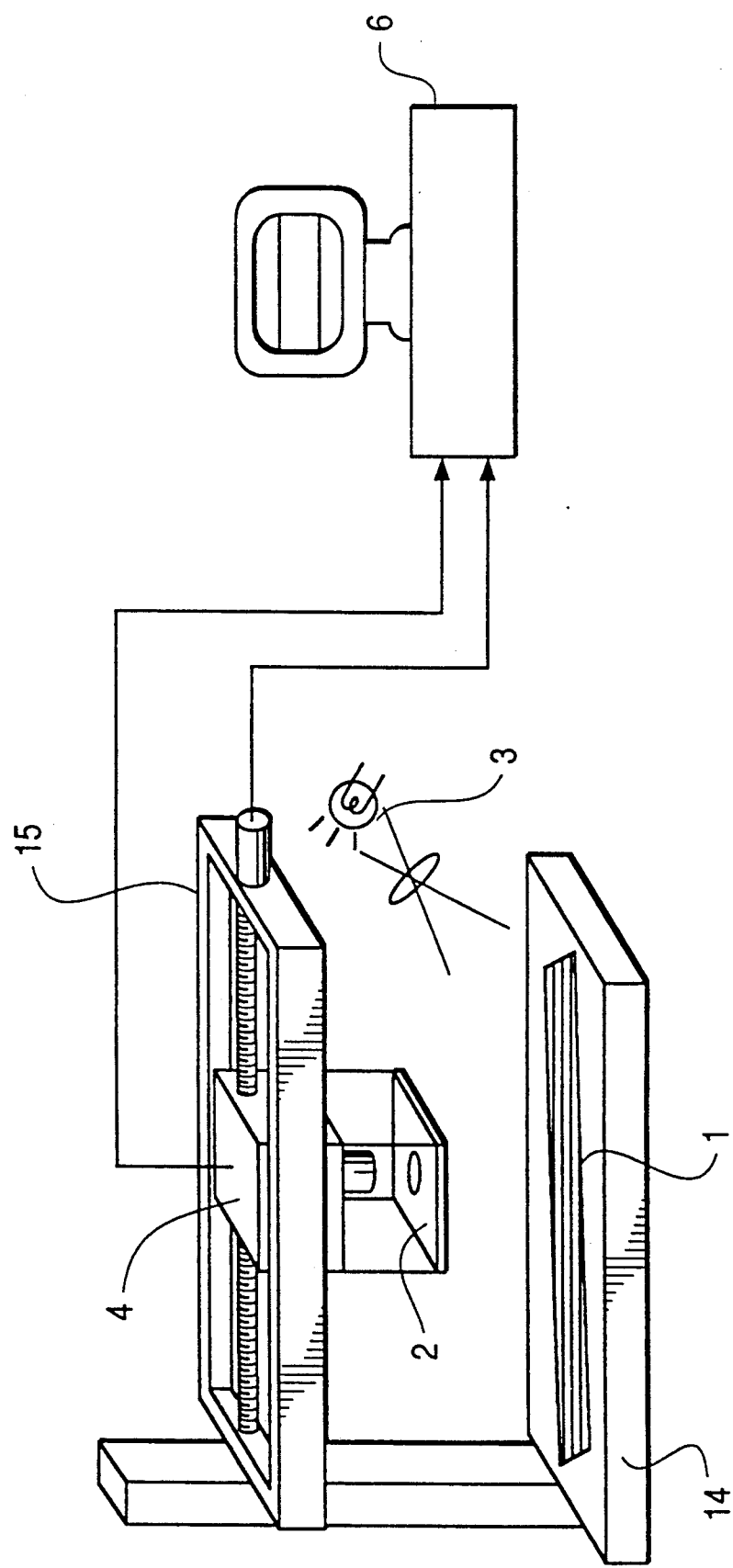
FIG. 7 is a view showing a magnetic recording signal measuring apparatus having a mechanism in which the photoelectric conversion apparatus moves.

In this embodiment, a movable table for moving the magnetic tape is used. However, the apparatus may be such that, as shown in FIG. 7, with the magnetic tape set up on a fixed table 14, a moving mechanism 15 for moving the photoelectric conversion device is included. Of course, it may be so designed that both the magnetic tape and the photoelectric conversion device are movable.

Although the invention has been exemplified for the case of carrying out the movement at a constant speed, the movement may be carried out at variable speed as long as the moving distance can be detected. In such a case, in the construction as shown in FIG. 1 or FIG. 7, the movable table 5 or the moving mechanism 14 may output a signal indicating a distance of movement sequentially to the analysis device 6 so that the analysis device 6 can obtain the moving distance at each moment at which the signal to be detected, such as a horizontal scanning signal has been obtained.

What is claimed is:

1. A method of measuring a displacement of a track on a magnetic tape comprising the steps of:

recording a periodically changing signal on a magnetic tape with a magnetic head to form a plurality of tracks each having recorded thereon the periodically changing signal under control for keeping a predetermined relative speed between said magnetic tape and said magnetic head in a longitudinal direction of each track;

attaching magnetic powder to said magnetic tape on which the plurality of tracks have ben formed so as to form on said magnetic tape a visual periodic pattern of recorded signal;

imaging said visual periodic pattern with an imaging device while applying light to said magnetic tape from a predetermined direction and moving at least one of said magnetic tape and said imaging device in a longitudinal direction of a track at a predetermined relative speed between said magnetic tape and said imaging device in the longitudinal direction of the track so as to obtain an image which changes periodically corresponding to said visual periodic pattern; and detecting a displacement of the track in the longitudinal direction thereof by comparing a relationship between a period of a periodic change of said image and said relative speed between said magnetic tape and said imaging device in said magnetic tape and said imaging device in said imaging step with a relationship between a period of a periodic change of said periodically changing signal and said relative speed between said magnetic tape and said magnetic head in said recording step.

2. A method according to claim 1, wherein a horizontal scanning signal of a video signal occurring at constant intervals of T is recorded on said magnetic tape while maintaining a predetermined constant relative speed V between said magnetic tape and said magnetic head in the longitudinal direction of each track in said recording step, wherein at leased one of said magnetic tape and said imaging device is moved in the longitudinal direction of the track at a predetermined constant relative speed V' so as to obtain an image whose brightness changes corresponding to a visual periodic pattern of recorded horizontal scanning signal in said imaging step, and wherein a displacement D of the track is detected in said detecting step by the following calculation:

$$D = (t1 \times V') - (T \times V)$$

where t1 is a period of a change of the brightness of said image.

3. An apparatus for measuring a displacement of a track on a magnetic tape comprising:

a table for placing thereon a magnetic tape on which a visual periodic pattern of recorded signal has been formed by recording a periodically changing signal with a magnetic head on said magnetic tape to form a plurality of tracks each having recorded thereon the periodically changing signal while maintaining a predetermined relative speed between said magnetic tape and said magnetic head in a longitudinal direction of each track and by thereafter attaching magnetic powder to said magnetic tape;

a means for applying light to said magnetic tape placed on said table from a predetermined direction;

an imaging device for imaging a portion on said magnetic tape applied with said light;

a drive means for moving at least one of said table and said imaging device in a longitudinal direction of a track on said magnetic tape placed on said table at a predetermined relative speed between said magnetic tape and said imaging device in the longitudinal direction of the track whereby said imaging device obtains an image which changes periodically corresponding to said visual periodic pattern of recorded signal; and a detecting device coupled to said imaging device for detecting a displacement of the track in the longitudinal direction thereof by comparing a relationship between a period of a periodic change of said image and said relative speed between said magnetic tape and said imaging device with a relationship between a period of a periodic change of said periodically changing signal and said relative speed between said magnetic tape and said magnetic head.

* * * * *